June 3, 1930.  L. DE FOREST  1,761,619
SOUND AND PICTURE RECORDING CAMERA
Filed Dec. 3, 1927

Inventor
Lee de Forest
By his Attorneys Darby & Darby

Patented June 3, 1930

1,761,619

UNITED STATES PATENT OFFICE

LEE DE FOREST, OF NEW YORK, N. Y., ASSIGNOR, BY MESNE ASSIGNMENTS, TO GENERAL TALKING PICTURES CORPORATION, A CORPORATION OF DELAWARE

SOUND AND PICTURE RECORDING CAMERA

Application filed December 3, 1927. Serial No. 237,400.

This invention relates broadly to cameras for photographically recording sounds and pictures.

One of the objects of this invention is to provide the combination of a picture recording camera and a sound recording device which is relatively simple in construction.

Another object of this invention is the provision of film feeding mechanism for intermittently feeding the film during the picture exposing operation and for continuously feeding film during the sound recording exposure.

A further object of this invention is the provision of a unitary photographic sound recording unit for attaching to standard form of cameras to adapt the camera for sound recording as well as picture recording.

A further object of this invention is the provision of a photion unit which may be detachably secured to the sound recording attachment.

A further object of this invention is the provision of a motor operated picture and sound recording camera in which means are provided for interrupting the motor circuit when desired.

These and other objects, which will be apparent from the following disclosure, are secured by means of this invention.

This invention resides substantially in the combination, construction, arrangement and relative location of parts all as will more fully be brought out below.

Referring to the drawings—

Figures 1, 2:
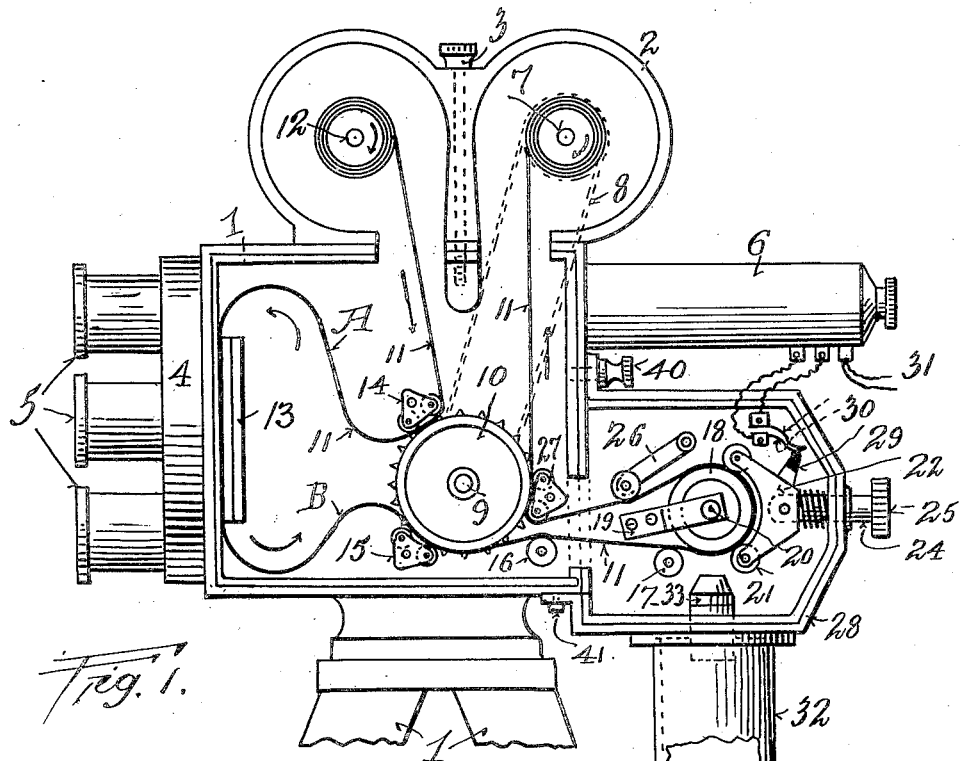
Figure 1 is a side elevational view of the device with the doors removed showing the interior thereof.
Fig. 2 is an enlarged end elevational view showing the employement of the flywheel.

Heretofore in the talking motion picture art it has been found necessary in order to obtain perfectly constant motion of the film past the sound photographing slide to introduce very elaborate and complicated changes in the ordinary motion picture camera. For example, it has been customary to place between the upper magazine of the camera and the camera itself a phonofilm or sound recording attachment containing one or two sprockets very accurately gauged for drawing the film down from the upper magazine and feeding it through the slit at a perfectly uniform speed. In this arrangement heavy flywheels were found necessary in order to assure constant speed and complicated mechanism provided for driving these elements in synchronism.

If the above method were not employed and in lieu thereof the sound recording light was impressed on the film where it ran over one of the regular sprockets in the camera, it was found that such sprockets or teeth were not cut with sufficient accuracy or that the shaft and bearings of said sprocket were not sufficiently true, so that the camera had to be practically remade with new, heavy and accurately ground shaft bearings and sprocket teeth, and a heavy flywheel put on said sprocket shaft. Moreover, in putting in the proper bearing into certain types of cameras, particularly the well known Bell-Howell camera, it has been necessary to do away with some of the special mechanism originally existing in the camera such as, for instance, the automatic fade-out device, thereby quite seriously impairing or limiting the suseful functions of the camera for special motion picture work, trick photography, and the like.

To overcome these difficulties I have invented an exceedingly simple attachment for a motion picture camera such as, for instance, the Bell-Howell camera, which can be easily applied with practically no changes in the camera and without in any way impairing its utility, and yet at the same time securing more accurate and distinct motion to the film past the sound recording light source and slit than has hitherto been possible.

Moreover, the improvement of this invention permits the use with the Bell-Howell camera of a small high speed motor, which is ordinarily furnished with such a camera for driving the same from a current source; whereas with the previous types of camera adapted for sound recording work it has been necessary to discard the motor usually supplied for driving the camera, and in its place employ a large heavy slow speed motor to drive the camera and the sound recording attachment, either by means of a belt or gear shafting. Such motor and gearing added very materially and seriously to the weight of the camera thereby impeding its rapid manipulation, operation of the camera, speedy change of locations, and the like. This invention on the other hand adds very little weight to the camera, and is moreover designed so that it can be completely and easily removed in case it is desired to use the camera for ordinary picture work.

Referring to the drawings, the camera case is shown at 1 provided with a film magazine 2 which is attachably secured thereto by means of the bolt 3. One end of the camera case is provided with a rotatable member 4 on which a plurality of lens systems 5 are provided so that by rotation of the member 4 "shots" of different lengths may be taken by employing the suitable lens system. A motor 6 is provided for driving the camera and is connected in any suitable manner (not shown) to the drum 7 on which the exposed film is wound. The drum 7 is arranged to drive the shaft 9 through the agency of the belt or chain connection 8. A large sprocket wheel 10 is mounted on the shaft 9 for rotation therewith. A drum 12 is provided in the film box 2 on which the unexposed film is mounted. The film, which is shown at 11, is fed downwardly between the sprocket 10 and the set of idle rollers 14. The film then passes through the film gate 13 which contains the intermittent motion mechanism (not shown) for intermittently moving the film down in front of the lens aperture where the film is momentarily fixed while the shutter is open to the picture being photographed on the film. A loop is formed in the film at A. The film after leaving the intermittent motion device 13 passes through a smaller loop B and then between the sprocket wheel 10 and the set of idle rollers 15. Without the sound recording attachment the film would then pass upwardly to be wound up on the drum 7.

All of the previous description relates to the well known Bell-Howell type of motion picture camera and does not, in itself, comprise any portion of the present invention. The device so far described is well known in the art and the description so far given has been supplied in order to make it easier to understand what the present invention really involves.

An opening is provided in the rear near the bottom of the casing 1 and a small rotatable idle roller is provided adjacent that opening. A unitary detachable casing 28, within which and on which are mounted all the necessary parts for moving the sound recording attachment, is shown in Fig. 1. Within the casing 28 is mounted a small rotatable idle roller 17 and near the approximate center of the casing is mounted for rotation the large smooth roller 18 which is journalled in the adjustable spindles 20 and 45. The spindle 20 is supported on a bracket 19 within the casing and the spindle 45 is mounted on a bracket 46 formed integral with the casing and exteriorly thereto. A yoke piece 22 is mounted on a short rod 24 which extends through the casing and is provided with the thumb nut 25. The ends of the yoke are provided with idle rollers 21 which under the action of a spiral spring engage the edges of the film 11 and cause it to frictionally engage the roller 18.

As is apparent from Fig. 2, the roller 18 is provided with narrow flanges on its ends so that the center of the film is out of contact therewith. This prevents any abrasion and scratching of the film surface as it passes over the roller. A short lever 26 is pivotally mounted on the casing and is provided with a rotatable roller on the end thereof. The roller is normally in contact with the film 11 under the action of gravity. As will be apparent, the film 11, instead of passing around the sprocket 10 and upwardly of the spindle 7 as it normally does in the picture-taking operation is passed over the rollers 16 and 17 and around the roller 18 and thence to the sprocket 10 against which it is held in contact by means of the idle rollers 27. The film then passes to the drum 7. A short insulating arm 29 is secured to the yoke and is arranged to cause the spring fingers 30, which are in series with the motor circuit, to contact when the yoke is in its normal spring-pressed position so that the rollers 21 thereon contact with the film. The lead wires to the motor 6 are shown at 31. Whenever the yoke is withdrawn to the right by means of the nut 25 the circuit is interrupted at the spring fingers 30 so that the motor stops. The gravity lever 26 is provided so as to apply a yielding pressure on the film to absorb any irregularities in the movement of the film. As will be apparent from Fig. 2, a heavy flywheel 47 is mounted on the same shaft with the roller 18 and is intended to impart steady motion to the rotation of the roller due to its inertia. As will be apparent from Fig. 1 the movement of the film through the device by reason of the rotation of the motor driven drum 7 causes the roller 18 and its attached flywheel to rotate.

A cylindrical tube 32 is attached to one side of the casing 28 by means of the well known slot and bayonet pin connection and is provided at its inner end with a suitable form of optical system for purposes to be described later. Within the tube 32 is a slit forming member 34 of a type which is usually well known in this art. A reduced cylindrical portion 35 is shown having a series of spring fingers 36 on the interior thereof to engage and center the photion tube 37 in a position adjacent the slit block 34. Any suitable lens system adapted to focus the reduced image of the slit on the film may be used. The casing 28 is provided with two projections, one of which slips over the pins 41 on the bottom of the casing 1 but hold the casing 28 in correct position with respect to the casing 1. The thumb nuts 40 are provided for clamping the other projection on the side of the casing 1, as is clear in the drawings.

A brief description of the operation of the device will be given. The fresh unexposed film is mounted in the magazine 2 on the drum 12 and is threaded between the sprocket 10 and the idle rollers 14 into the intermittent feed device 13 and has a large loop A formed therein. The film then passes through a smaller loop B and between the sprocket 10 and idle rollers 15. The film then passes over the rollers 16 and 17, around the roller 18, and between the idle rollers 27 and the sprocket 10 and finally is attached to the drum 7. The motor 6, which is operatively connected to the main sprocket 9 in any suitable manner, rotates the sprocket 9 and through the agency of the chain or belt 8 rotates in unison therewith the drum 7. This causes the film to unwind from the drum 12 and wind up on the drum 7 passing by the picture aperture in back of one of the lens system 5 and passing through the sound recording attachment by the lens system 33. By mounting the heavy flywheel on the shaft with the roller 18 and providing the gravity lever 26 the film passing through the sound recording attachment is given a perfectly steady motion which is essential in the process of photographically recording sound. Whenever it is desired to remove the film from the roller 18 or to examine it the motor may be stopped in one method by pulling on the knob 25 which interrupts the motor and releases the film for removal from the roller. At 50 is shown a door attached to the casing 28 for normally closing it and it is noted that no door is shown for the casing 1 although it is always present.

From the foregoing it will be apparent that the sound recording attachment is mounted in a single unit and can be quickly attached to the casing 1 and removed therefrom as desired. By this simple operation the standard camera may be attached for sound recording as well as picture taking. It is also pointed out that the lens systems, slit member, and photion tube are all provided as a unitary structure for easy attachment to the sound recording casing.

I am well aware that many changes in the details of construction and relative arrangement of parts will readily occur to those skilled in the art and I do not, therefore, desire to be limited to the exact structure shown by me for purposes of illustration but rather to the underlying principles of my invention as they are defined below.

What I seek to secure by United States Letters Patent is:—

1. The combination with a standard motion picture camera for recording pictures on a film comprising a toothed sprocket for feeding the film through the camera and a motor for driving said sprocket, of a casing for attachment to said camera and intercommunicating therewith, a smooth rotatable roller in said casing over which the film passes, a flywheel attached to said roller for rotation therewith, the sprocket operating to continuously feed the film to and from said casing, a yoke having contact rollers thereon for holding the film on said roller, said roller being driven by the film, a spring for holding the yoke and rollers in contact with the film, and a switch connected to the motor arranged to be opened when the yoke and contact rollers are moved out of contact with the film to stop the motor.

2. The combination with a standard motion picture camera for recording pictures on a film comprising a toothed sprocket for feeding the film through the camera and a motor for driving said sprocket of a sound recording attachment comprising a casing for attachment to said camera adapted to intercommunicate therewith, a smooth rotatable roller in said casing over which the film passes, a light source and a slit, an optical system arranged so that an image of the slit is focused on the film at a point in contact with the roller, and an inertia wheel mounted for rotation with said roller, said roller and inertia wheel being rotated by the film when in motion.

3. The combination with a standard motion picture camera for recording pictures on a film comprising a toothed sprocket for feeding the film through the camera and a motor for driving said sprocket of a detachable casing, adapted to intercommunicate with said camera including a bracket, a smooth roller and a flywheel journaled in said casing and bracket, the film for said camera passing over said roller to drive it and the flywheel, resilient means for causing the film to hug the surface of the roller and a light source, slit member and optical system for focusing an image of the slit on the film.

4. A unitary phonofilm attachment for standard motion picture cameras adapted to hold and intercommunicate with such attachment for recording sound on a film after photographs have been recorded thereon comprising a casing, a smooth roller and a flywheel journaled on the casing for rotation, the film passing from said camera into said casing around said roller, means causing the film to engage the roller closely and gravity means in contact with the film to steady its motion on passing through said casing, over said roller and back into said camera.

5. A unitary phonofilm attachment for standard motion picture cameras containing prelocated openings for purposes of communication with, and holding means for said attachment for recording sound on a film comprising a casing, a smooth roller and a flywheel journaled on the casing for rotation, the film passing around said roller, means causing the film to engage the roller closely, gravity means in contact with the film to steady its motion, and means on the casing for impressing light variations on the film in a fine line.

6. A unitary phonofilm attachment for standard motion picture cameras containing prelocated openings for purposes of communication with, and holding means for said attachment for recording sound on a film comprising a casing, a smooth roller and a flywheel journaled on the casing for rotation, the film passing around said roller, means causing the film to engage the roller closely, gravity means in contact with the film to steady its motion, and a light source, slit block and optical systems for focusing an image of the slit on the moving film.

7. The combination with a standard motion picture camera and a sound recording attachment therefor, having a casing in communication with said camera through an opening, of means for passing the film from said camera through the opening into the sound recording attachment and back into the camera.

8. The combination with a standard motion picture camera of a sound recording attachment including means for uniformly and continuously feeding the film out of the camera and through said attachment and back into said camera, and means for recording a sound record on the film while in said attachment.

9. A motion picture camera having film magazines, a detachable casing for said camera, said casing and camera being intercommunicating, a smooth roller in said casing, a rotatable inertia wheel mounted on the shaft of said smooth roller, means in said camera for feeding the film through the camera for photographic recording purposes and through the casing around said roller for sound recording purposes, together with means in said casing for holding the film against the roller.

10. The combination with a standard motion picture camera for recording pictures on a film comprising a casing attached to and intercommunicating with said camera, and a toothed sprocket for feeding the film through the camera and continuously to and from said casing, and a motor for said sprocket, of a smooth rotatable roller in said casing over which the film passes, a yoke having contact rollers thereon for holding the film on said roller, said roller being driven by the film, a spring for holding the yoke and rollers in contact with the film, and a switch connected to the motor arranged to be opened when the yoke and contact rollers are moved out of contact with the film to stop the motor.

In testimony whereof I have hereunto set my hand on this 30th day of November, A. D., 1927.

LEE DE FOREST.